Dec. 20, 1955  L. H. WRIGHT  2,727,581
TANDEM HITCH

Filed Jan. 26, 1953  4 Sheets-Sheet 1

Laurel H. Wright
INVENTOR.

Dec. 20, 1955
L. H. WRIGHT
2,727,581
TANDEM HITCH
Filed Jan. 26, 1953
4 Sheets-Sheet 2
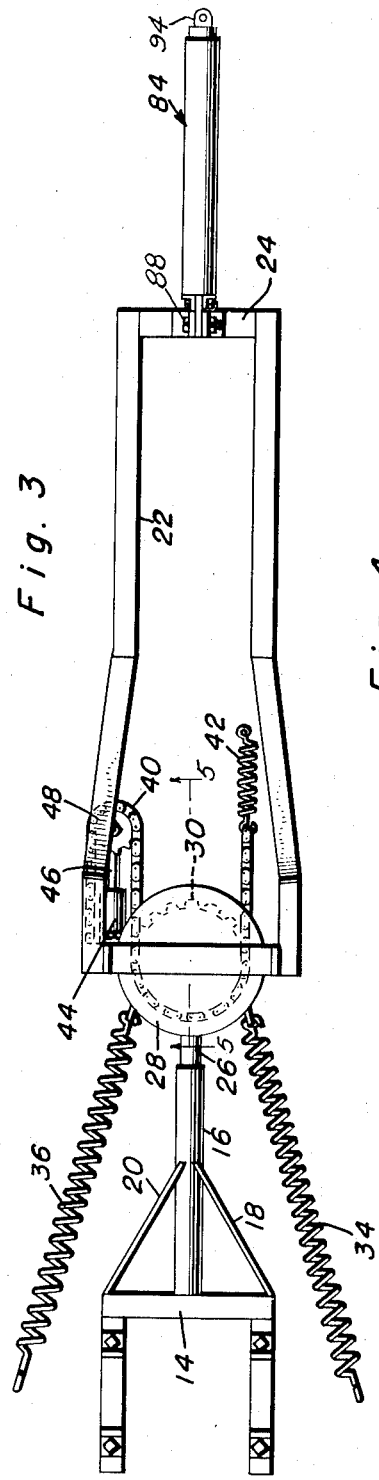
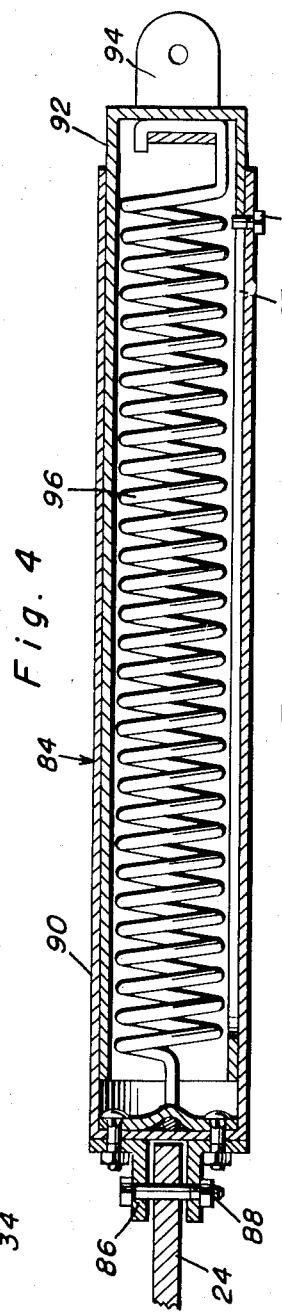
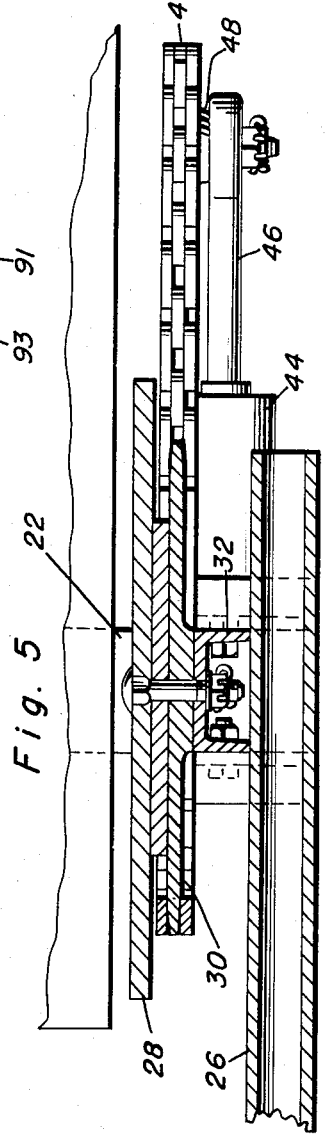
Laurel H. Wright
INVENTOR.

Dec. 20, 1955 L. H. WRIGHT 2,727,581
TANDEM HITCH
Filed Jan. 26, 1953 4 Sheets-Sheet 3

Laurel H. Wright
INVENTOR.

Dec. 20, 1955 L. H. WRIGHT 2,727,581
TANDEM HITCH
Filed Jan. 26, 1953 4 Sheets-Sheet 4

Laurel H. Wright
INVENTOR.

BY Clarence A. O'Brien
and Harvey B. Jacobson
Attorneys

United States Patent Office 2,727,581
Patented Dec. 20, 1955

2,727,581
TANDEM HITCH
Laurel H. Wright, Kremlin, Mont.

Application January 26, 1953, Serial No. 333,131

8 Claims. (Cl. 180—12)

This invention relates to an equalizing drawbar and particularly to a drawbar for connection between a pair of tandem connected tractors for equalizing the tractive effort of the tractors according to the power thereof.

In the utilization of tractors it is frequently desirable to hook two or more tractors in tandem in order to secure sufficient power or tractive efforts for the particular job being done. However, when tractors are connected solidly in tandem there is considerable loss of tractive effort because the tractors operate at disadvantage when operating against a solid hitch.

The present invention provides an equalizing drawbar having a spring actuated connection so that each tractor may develop its maximum tractive effort. This is accomplished by means of a telescoping guide member controlling the motion of the tractors with respect to each other and a resilient hitch member connecting the tractors together and maintaining the telescoping member in substantially telescoped relation. Preferably the resilient connection has a strength substantially equal to or at least commensurate with the tractive effort of the leading tractor or tractors.

It is accordingly an object of the invention to provide an improved equalizing hitch for tractors.

It is a further object of the invention to provide a spring-actuated telescoping drawbar.

It is a further object of the invention to provide a hitch arrangement by which a pair of tandem connected tractors may each develop its maximum tractive effort.

It is a further object of the invention to provide a hitch for controlling a pair of tandem operated tractors.

Other objects and many of the attendant advantages of this invention will be apparent from the following detailed description taken in conjunction with the accompanying drawings, in which:

Figure 3 is a top plan view of the equalizing drawbar;

Figure 4 is an enlarged horizontal section of the final equalizing unit taken substantially on line 4—4 of Figure 2;

Figure 5 is an enlarged sectional view of the steering mechanism taken substantially on line 5—5 of Figure 3;

Figure 1:
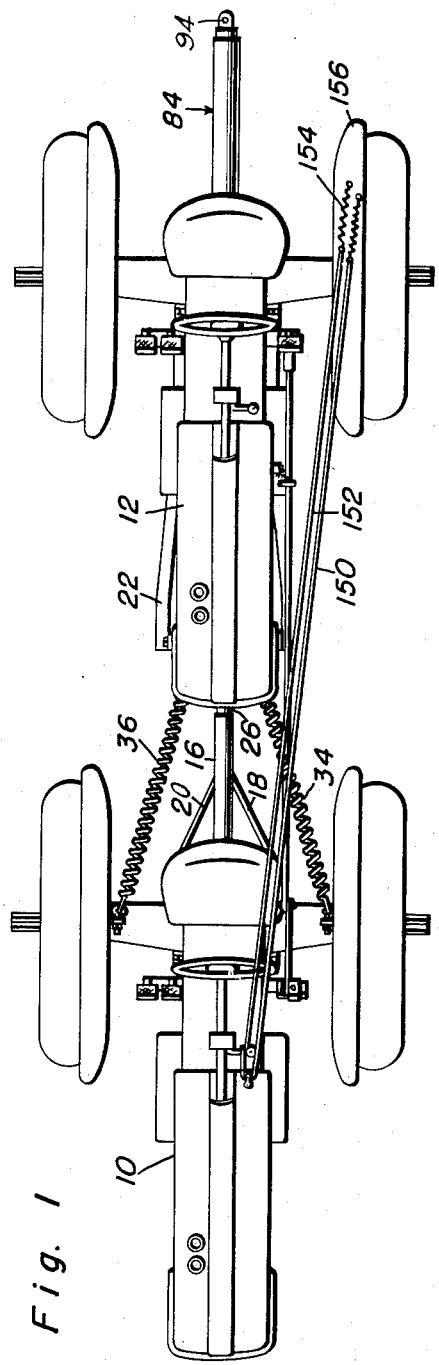
Figure 1 is a top plan view of a pair of tandem connected tractors utilizing equalizing drawbars of the present invention.
Figure 2:
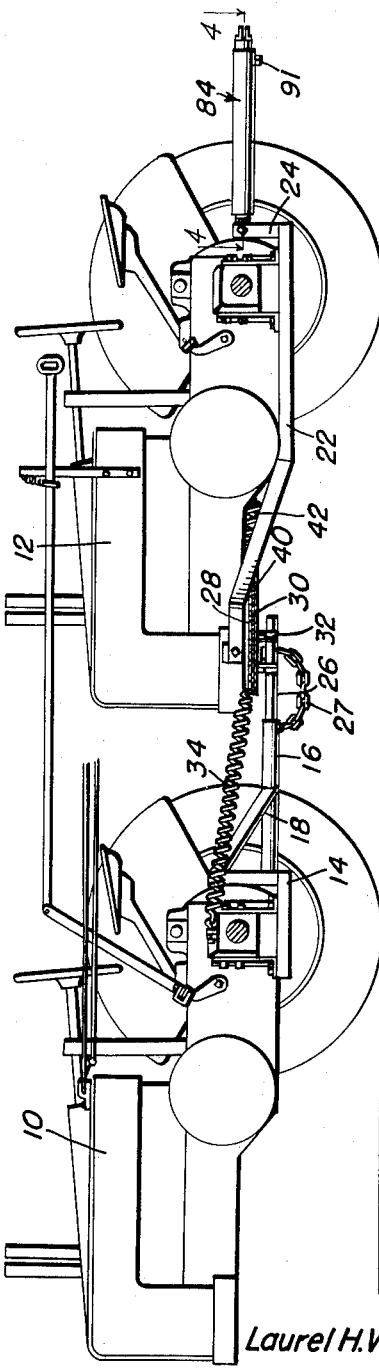
Figure 2 is a side elevation of the tractor system.

In the exemplary embodiment of the invention a plurality of tractors herein illustrated as a leading tractor 10 and a trailing or rearward tractor 12 are connected by means of the hitch according to the invention.

A rigid frame 14 is fixed on the forward tractor 10 and a telescoping member 16 extends rearwardly from the frame 14. Rigidifying braces 18 and 20 secure the outer telescoping member 16 rigidly to the frame 14 so that the outer telescoping member 16 extends directly rearwardly from the leading or forward tractor 10. A second fixed frame 22 is rigidly connected to the following or after tractor 12 and preferably extends substantially the full length thereof so that an upstanding hitch bar 24 is provided at the rear end of the after tractor. An inner telescoping member 26 is connected to the frame 22 by an articulation preferably in the form of a fifth wheel having a plate 28 rigidly mounted on the frame 22 and a sprocket disk 30 rigidly mounted on the end of the inner telescoping member 26 by means of suitable brackets 32. The front or steering wheels of the following tractor 12 have been removed or replaced by the fifth wheel plate 28 and the connection 30, 32 to the inner telescoping member. Likewise the front or steering wheels have been removed from the leading tractor and the steering of the tandem units is provided by controlling the sprocket wheel 30 of the fifth wheel arrangement.

The tractive effort of the front tractor is transmitted to the after tractor solely by means of the springs 34 and 36. The telescoping members and the articulating means serving solely for alignment and steering purposes. The strength of the springs 34 and 36 is sufficient so that the springs will transmit the maximum tractive effort of the forward tractor without being permanently deformed. The springs 34 and 36 provide a resilient connection between the fore and after tractor so that when in operation the telescoping members will be in constant sliding movement or extending or retracting as the springs absorb or return energy. The extent of the telescoping motion will be proportional to the length of the springs, long springs providing proportionally greater play. While the yield point of the springs is greater than the tractive effort of the forward tractor it is desirable to provide a safety link to prevent unforeseen disturbances from damaging the springs or uncoupling the telescoping members 16 and 26, or the members 90 and 92 of equalizing hitch 84 to be subsequently described. Obviously, many safety links could be used as for example a chain 27 is connected between the members 16 and 26, and the member 90 is provided with a stud 91 sliding in a slot 93 in the member 92.

The steering of the tandem tractors is accomplished by means of the fifth wheel plate 30 and the sprocket plate 28. A control chain 40 is entrained over the sprocket wheel or disk 30 and one end of the sprocket chain 40 is connected to the after tractor by means of a spring 42, the other end of the sprocket chain 40 is connected rigidly to the frame 22 and a fluid operated cylinder 44 provided with a piston rod 46 which has a sprocket wheel 48 journaled on the outer end thereof and the sprocket chain 40 is entrained over the sprocket wheel 48 so that the extension of the piston 46 draws the chain against the tension of the spring 42 and causes the sprocket disk 30 to assume an angulated relation with respect to the wear plate 28. This causes the guide telescoping members 16 and 26 to take up an angular relation with respect to the frame 22 so that the wheels of the forward tractor 10 are at an angular relation with respect to the wheels of the after tractor 12 so that the tractors will operate in a circular motion so that they may turn corners or otherwise be turned about.

Figure 9:
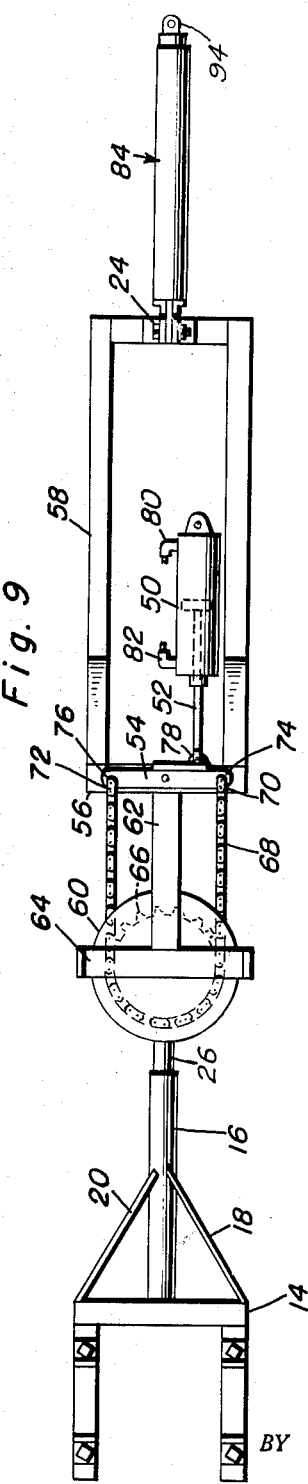
Figure 9 is a modified steering arrangement.

Instead of connecting the chain 40 by means of a resilient member 42 the chain may be positively controlled by a double acting piston 50, as shown in Figure 9, which has a piston rod 52 connected to an oscillating lever or yoke 54 which is mounted on the forward end 56 of a modified frame 58 while the fifth wheel disk 60 is mounted on an extension arm 62 having a T-shaped guide plate 64. A sprocket plate 66 being connected in a similar manner to the inner telescoping member 26. A chain 68 is entrained around the sprocket plate 66 which underlies the wear plate 60 and has the opposite ends 70 and 72 connected to the ends 74 and 76, respectively, of the oscillating bar 54, while the piston rod 52 is connected to an ear 78 adjacent one end of the oscillating bar 54. Fluid connections 80 and 82 to the opposite ends of the piston 50 positively propel the piston rod 52 in opposite directions so that the oscillating bar or yoke 54 may be angularly adjusted with respect to the front end 56 of the frame 58 so that the chain 68 may be moved to cause angular position of the sprocket plate 66 with respect to the wear plate 60 so that the tractors will operate at an angular relation and thus cause turning motion thereof.

A further equalizing hitch 84 comprises a forward clevis member 86 which is connected to the drawbar 24 by means of a suitable bolt 88 permitting pivoting about a horizontal axis. An outer telescoping member 90 is rigidly connected to the forward clevis 86 and extends rearwardly therefrom. An inner telescoping member 92 is provided with a rear clevis 94 which permits pivoting about a vertical axis, and which may be connected to another of the tandem tractors or to a load or between any of the tandem tractors as may be desired. A spring element 96 connects the forward clevis 86 to the rear clevis 94 and transmits the tractive efforts of the leading tractors through the drawbar 24 with the spring 96 having a strength sufficient to transmit the maximum tractive effort of the leading tractors to the load without damaging the spring, so that the spring will transmit the full tractive effort of the tractors to the clevis 94 as may be desired. As is the condition with springs 34 and 36, the spring 96 will be in constant motion absorbing or delivering energy to the load as conditions may require. The give and take of the springs 34, 36 and 96 combining to provide substantially constant average progress of the assembly without shock to the components thereof.

When the leading tractor is provided with a steering mechanism of its own such as the tractor 100 having a trailing tractor preferably of a two-wheel variety 102, the outer telescoping member 104 is preferably rigidly attached to the after tractor and if desired the fixed frame may be omitted and the outer telescoping member 104 rigidly connected to the forward end of the after tractor by means of a bracket 106 and a bracket 108 which rigidly fix the member 104 longitudinally of the after tractor 102. The bracket 108 is preferably provided with a ball and socket joint 110 so that the base 112 may be angulated with respect to the portion 114 so that the after bracket 108 may be adjustable with respect to any type of tractor on which it is connected. The inner telescoping member 116 is provided with an articulated joint 118 in the form of a universal joint between the connection 120 to the forward tractor 100.

Figure 6:
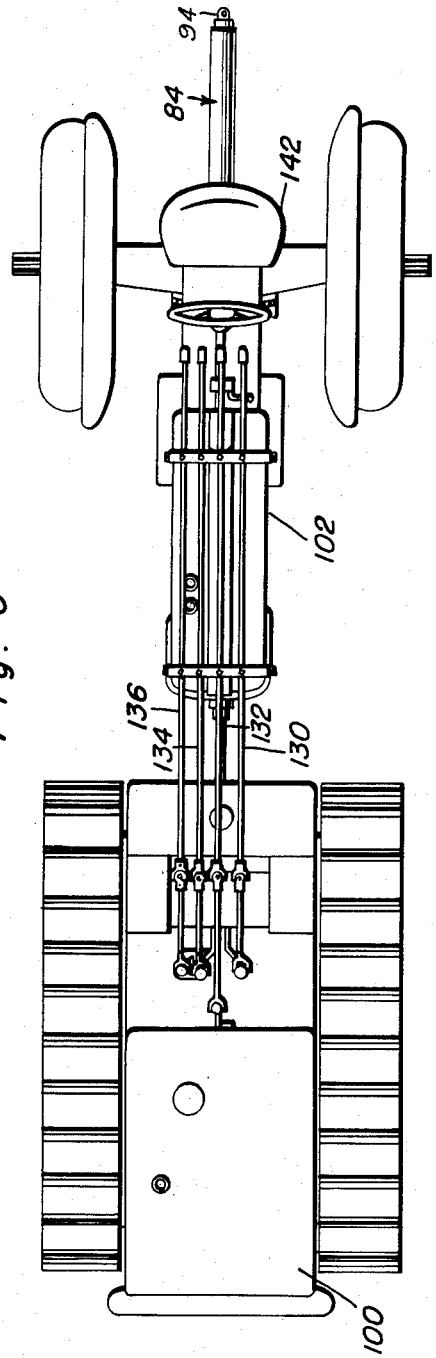
Figure 6 is a top plan view of a modification according to the invention.
Figure 7:
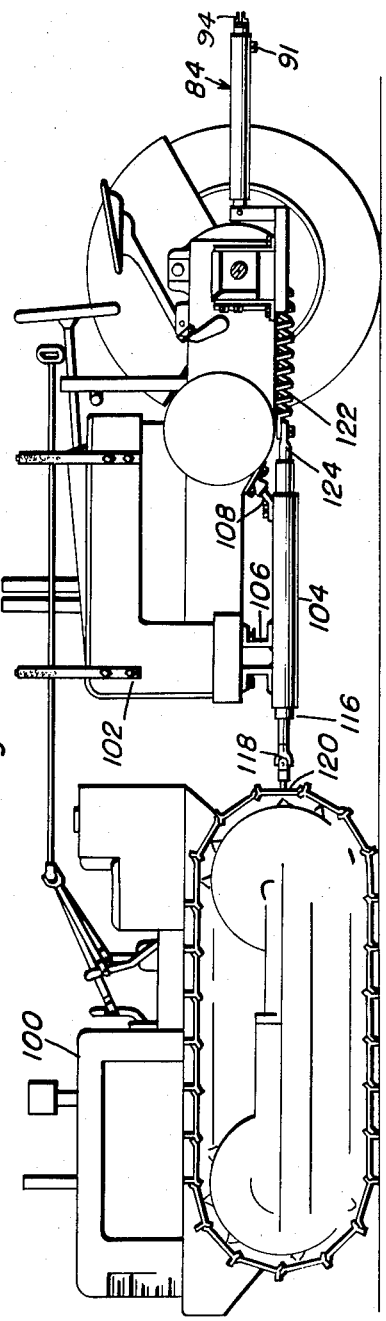
Figure 7 is an elevation of the modification according to Figure 6.
Figure 8:
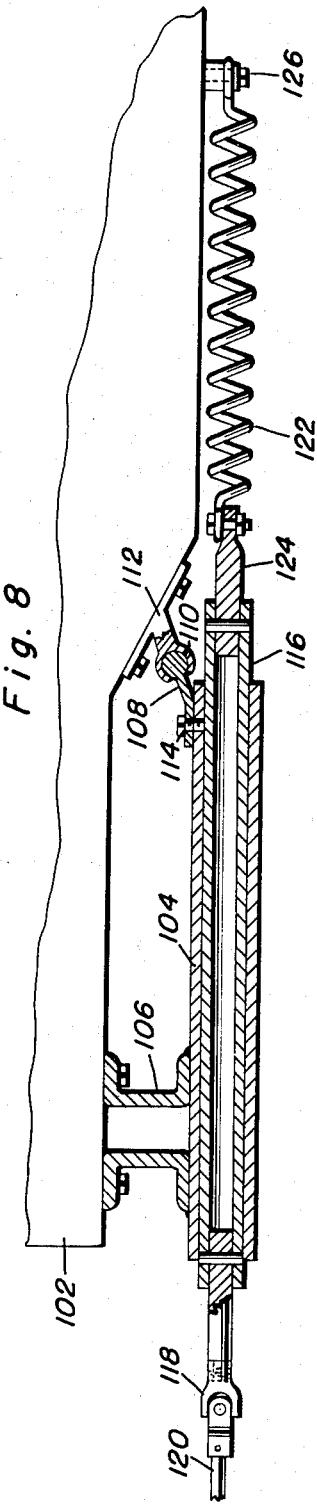
Figure 8 is a longitudinal vertical section through the modified drawbar.

A spring element 122 may be rigidly connected to the after tractor, instead of onto the forward tractor and as shown in Figures 6, 7 and 8 the resilient element 122 is shown connected to the rear end of the inner telescoping member 116 by means of a suitable hitch 124 and secured to the after tractor by means of a hitch 126. In this type of resilient connection the inner telescoping member 116 becomes a drawbar so that the tractive effort of the leading tractor is transmitted through the inner telescoping member instead of directly to the resilient members.

Figure 10:
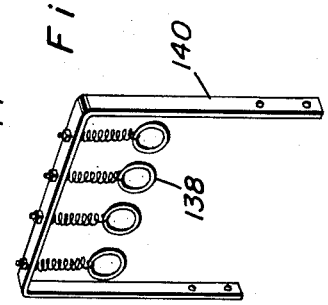
Figure 10 is a perspective of a steering gear support.

Instead of steering by means of a fifth wheel arrangement interposed between the inner telescoping member and one of the tractor elements, the front tractor element may be independently steered, for this purpose we have shown pull rods 130, 132, 134 and 136 connected to the various control elements of the leading tractor and extending through rings 138 supported in a U-shaped yoke 140, as shown in Figure 10, so that the after ends of the members 130 to 136 will be available to an operator seated on the seat 142 of the after tractor 102.

Further steering is done by means of a fifth wheel arrangement between the tractors and it is only necessary to control the brake and throttle of the tractor and for this purpose control lines 150 and 152 are extended from the front tractors to the rear tractor 12 and hitched by means of suitable resilient elements 154 to any suitable point such as a fender 156 of the after tractor.

In the operation of the hitch any desired number of tractive devices either of equal or materially different load characteristics may be connected in tractive relation to a load. The entire tractive effort being transmitted both between the tractor devices and the load by resilient members. In use the resilient members will normally be in substantially constant motion, with the individual resilient elements cushioning the shocks incurred in operation. The individual tractive devices and the load will show variations of speed but the entire assembly will make substantially steady progress without serious danger of applying damaging shock to any part of the assembly. In this way, each of the tractors can develop its maximum tractive effort without obstructing any of the tractive effort of the remaining tractors and without danger of breakage should an obstruction to the operation of the tractors be met. Likewise the tractors may either be controlled by means of a power driven articulated joint, as shown in Figures 3 and 5, which is controllable between the individual tractors or by steering the forward tractor and allowing the after tractor to assume a proper angular relation with respect to the leading tractor so that it may follow around.

For purpose of exemplification a particular embodiment of the connection has been shown, and described according to the best present understanding thereof. It will be apparent to those skilled in the art that many changes and modifications can be made therein without departure from the true spirit of the invention.

Having described the invention, what is claimed as new is:

1. A tandem connection for a pair of tractors comprising a frame rigidly connected to the forward tractor, a telescoping guide rigidly mounted on said frame, said telescoping guide extending rearwardly from said forward tractor, a second frame rigidly mounted on the following tractor, a fifth wheel connection between said telescoping guide and said second frame, a resilient connection between said forward and said following tractor, said resilient connection having a pulling strength equal to the tractive effort of said forward tractor.

2. A tandem connection for a pair of tractors comprising a frame rigidly connected to the forward tractor, a telescoping guide rigidly mounted on said frame, said telescoping guide extending rearwardly from said forward tractor, a second frame rigidly mounted on the following tractor, a fifth wheel connection between said telescoping guide and said second frame, a resilient connection between said forward and said following tractor, said resilient connection having a pulling strength equal to the tractive effort of said forward tractor, a telescoping drawbar journaled on said second frame, said drawbar extending rearwardly from said following tractor, a hitch on the end of said drawbar, a spring maintaining said telescoping drawbar in collapsed condition, said spring having a pulling strength equal to the tractive effort of said pair of tractors.

3. A tandem connection for a pair of tractors comprising a frame rigidly connected to the forward tractor, a telescoping guide rigidly mounted on said frame, said telescoping guide extending rearwardly from said forward tractor, a second frame rigidly mounted on the following tractor, a fifth wheel connection between said telescoping guide and said second frame, a resilient connection between said forward and said following tractor, said resilient connection having a pulling strength equal to the tractive effort of said forward tractor, a fluid actuated cylinder mounted on one of said frames, a sprocket fixed to the other of said frames coaxial with said fifth wheel, a chain operatively connecting said cylinder to said sprocket.

4. A tandem connection for a pair of tractors comprising a frame rigidly connected to the forward tractor, a telescoping guide rigidly mounted on said frame, said telescoping guide extending rearwardly from said forward tractor, a second frame rigidly mounted on the following tractor, a fith wheel connection between said telescoping guide and said second frame, a resilient connection between said forward and said following tractor, said resilient connection having a pulling strength equal to the tractive effort of said forward tractor, a fluid actuated cylinder mounted on one of said frames, a sprocket fixed to the other of said frames coaxial with said fifth wheel, a chain operatively connecting said cylinder to said sprocket, resilient means acting in opposition to said cylinder.

5. A tandem connection for a pair of tractors comprising a frame rigidly connected to the forward tractor, a telescoping guide rigidly mounted on said frame, said telescoping guide extending rearwardly from said forward tractor, a second frame rigidly mounted on the following tractor, a fifth wheel connection between said telescoping guide and said second frame, a resilient connection between said forward and said following tractor, said resilient connection having a pulling strength equal to the tractive effort of said forward tractor, a fluid actuated cylinder mounted on one of said frames, a sprocket fixed to the other of said frames coaxial with said fifth wheel, a chain operatively connecting said cylinder to said sprocket, an oscillating bar mounted on said frame with said cylinder, said cylinder being connected adjacent one end of said bar, opposite ends of said chain being connected to opposed ends of said oscillating bar.

6. An equalizing drawbar for a plurality of tandem hitched tractors comprising a telescoping guide extending between the leading and following tractors, said telescoping guide being rigidly connected to said leading tractor, a frame rigidly mounted on the following tractor, a vertically pivotal articulated connection operatively connecting said telescoping guide to said frame, spring means independent of said telescoping guide hitching said leading tractor to the frame on said following tractor, said spring having a tensile strength equal to the tractive effort of the leading tractor, a load engaging hitch, said hitch including a front clevis mounted on said frame, said front clevis being horizontally swingable with respect to said frame, a rear clevis, a telescoping member interposed between said front and rear clevises, a spring connected between said front and rear clevises, said spring having a tensile strength equal to the tractive effort of the plurality of tractors.

7. An equalizing drawbar for a plurality of tandem hitched tractors comprising a telescoping guide extending between the leading and following tractors, said telescoping guide being rigidly connected to said leading tractor, a frame rigidly mounted on the following tractor, a vertically pivoted articulated connection operatively connecting said telescoping guide to said frame, spring means hitching said leading tractor to the frame on said following tractor, said spring means having a tensile strength equal to the tractive effort of the leading tractor, a load hitch, said hitch including a front clevis mounted for horizontal swinging movement on said frame, a rear clevis, a telescoping member interposed between said front and rear clevises, a spring connected between said front and rear clevises, said spring having a tensile strength equal to the tractive effort of the plurality of tractors, and power means connected to said articulated connection operative to control the angular relation between said telescoping guide and said frame.

8. An equalizing drawbar for a plurality of tandem hitched tractors comprising a first frame rigidly mounted on the leading tractor, a telescoping guide rigidly secured to said first frame, rigidifying braces between said first frame and said telescoping guide, a second frame rigidly mounted on the following tractor, said telescoping guide extending between the leading and following tractors, spring means hitching said leading tractor to said frame on said following tractor, said spring having a tensile strength equal to the tractive effort of the leading tractor, a load hitch, said hitch including a front clevis mounted for horizontal swinging motion on said second frame, a rear load engaging clevis, a telescoping member interposed between said front and rear clevises, a spring connected between said front and rear clevises, said spring having a tensile strength equal to the tractive effort of the plurality of tractors, an articulated connection operatively connected beween the telescoping guide and said second frame, a fluid operated cylinder mounted on said second frame, said cylinder being operatively connected to said telescoping fluid operated cylinder mounted on said second frame, said telescoping guide and said second frame.

References Cited in the file of this patent

UNITED STATES PATENTS

| | | |
|---|---|---|
| 1,940,061 | Paul | Dec. 19, 1933 |
| 1,990,328 | Jett | Feb. 5, 1935 |
| 2,368,202 | Clark | Jan. 30, 1945 |
| 2,537,245 | Thompson | Jan. 9, 1951 |

FOREIGN PATENTS

| | | |
|---|---|---|
| 102,929 | Sweden | Oct. 28, 1941 |